ately bonded to and project into the interiors of the cases where they encircle enclosure rings positioned adjacent to the cones of the bearing. The enclosures normally do not engage the rings, but when a pressurized lubricant is introduced into the cases and surrounds the inwardly projecting portions of the elements, those portions of the elements will flex inwardly and bear against the rings, forming seals therewith. Thus, the bearing assembly can be relubricated without leakage of the lubricant past the labyrinth enclosures.

United States Patent

[11] 3,628,837

[72] Inventor Dennis L. Otto
  Canton, Ohio
[21] Appl. No. 878,700
[22] Filed Nov. 21, 1969
[45] Patented Dec. 21, 1971
[73] Assignee The Timken Company
  Canton, Ohio

[54] BEARING ASSEMBLY HAVING FLEXIBLE LABYRINTH ENCLOSURES
  5 Claims, 3 Drawing Figs.

[52] U.S. Cl. .................................................. 308/187
[51] Int. Cl. .................................................. F16c 1/24
[50] Field of Search .................................... 308/187; 277/153

[56] References Cited
  UNITED STATES PATENTS
1,908,956  5/1933  Chievitz .................. 308/187
2,973,230  2/1961  Eastburg ................. 308/187
3,112,417  11/1963 Tomm ..................... 308/187
3,320,007  5/1967  Tennies et al. .......... 308/187
3,472,519  10/1969 Gehret .................... 277/153
  FOREIGN PATENTS
693,349  6/1953  Great Britain ........... 308/187

Primary Examiner—Martin P. Schwadron
Assistant Examiner—Frank Susko
Attorney—Gravely, Lieder & Woodruff ABSTRACT: A bearing assembly includes a tapered roller bearing having a cup from which labyrinth type enclosures extend. The enclosures include cases attached to the cup and flexible labyrinth elements which are bonded to and project into the interiors of the cases where they encircle enclosure rings positioned adjacent to the cones of the bearing. The enclosures normally do not engage the rings, but when a pressurized lubricant is introduced into the cases and surrounds the inwardly projecting portions of the elements, those portions of the elements will flex inwardly and bear against the rings, forming seals therewith. Thus, the bearing assembly can be relubricated without leakage of the lubricant past the labyrinth enclosures.

INVENTOR
DENNIS L. OTTO
BY Gravely, Lieder & Woodruff
ATTORNEYS

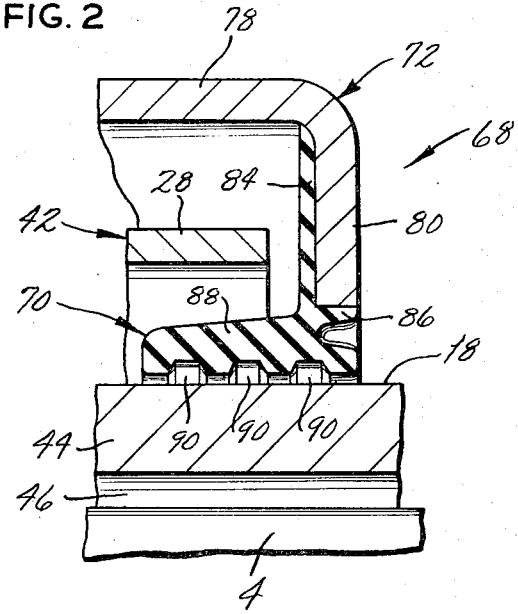
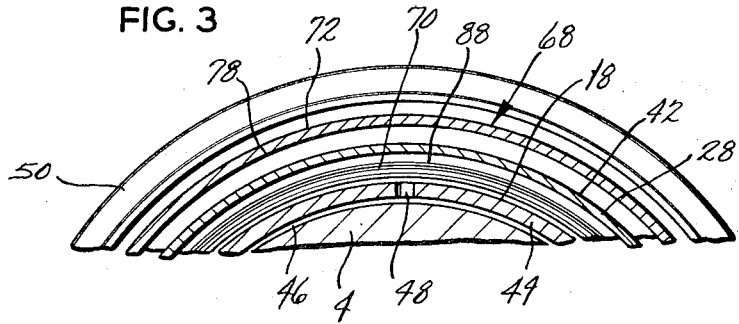

3,628,837

BEARING ASSEMBLY HAVING FLEXIBLE LABYRINTH ENCLOSURES

BACKGROUND OF THE INVENTION

This invention relates in general to a bearing assembly and more particularly to a bearing assembly having labyrinth enclosures.

One way to form a lubricant barrier along a rotating shaft is to circumscribe the shaft with a so-called labyrinth enclosure. These devices extend axially along a considerable portion of the shaft in comparison to conventional lip seals, but they do not engage the rotating shaft as do lip seals. Thus, labyrinth enclosures are not subjected to the wear and heat experienced by lip seals. Labyrinth enclosures or seals of current manufacture are rigid devices which are provided with a plurality of axially spaced annular grooves for creating turbulence in the lubricating medium. This turbulence in turn creates a lubricant barrier and prevents the lubricant from flowing along the shaft as long as the shaft rotates. Once the shaft stops rotating the surface tension of the lubricant at the shaft surface and encircling enclosure surface is sufficient to prevent significant leakage, particularly where viscous lubricants are employed such as in bearing assemblies. However, when the pressure of the lubricant is elevated the surface tension is overcome and the lubricant escapes through the gap or space between the labyrinth enclosure and the shaft. This defect in conventional labyrinth enclosures is particularly troublesome in the relubrication of bearings, since much of the pressurized lubricant forced into the bearing escapes before the bearing is completely full.

SUMMARY OF THE INVENTION

One of the principal objects of the present invention is to provide a bearing assembly with labyrinth enclosures which prevent the loss of lubricant as the bearing assembly is relubricated. Another object is to provide an elastomeric labyrinth enclosure of the type stated which does not engage rotating surfaces and therefore, is not subjected to wear and friction induced heat. These and other objects and advantages will become apparent hereinafter.

The present invention is embodied in an enclosure including a flexible sleeve which encircles a shaft. When the sleeve is subjected to pressurized a lubricant on its outwardly presented surface it forms a seal along the shaft during the time the lubricant is maintained under pressure. The invention further resides in a bearing assembly provided with such enclosures. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 2 is an enlarged sectional view of the labyrinth enclosure; and

FIG. 3 is a sectional view taken along line 3–3 of FIG. 1.

DETAILED DESCRIPTION

Figure 1:
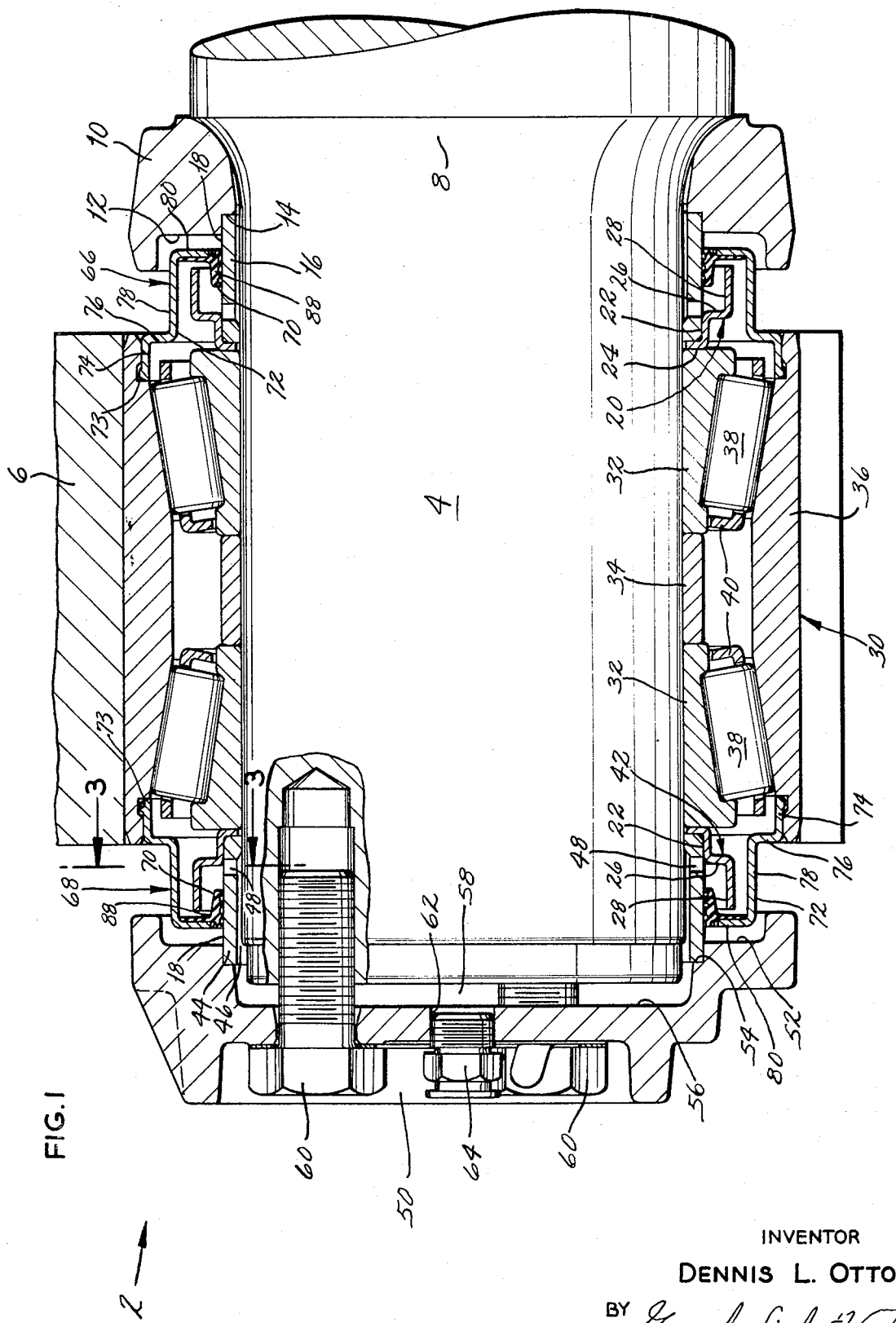
FIG. 1 is a longitudinal sectional view of a bearing assembly provided with labyrinth enclosures of the present invention.

Referring now to the drawings, 2 designates a bearing assembly for journaling the end of an axle or a shaft 4 in a containing structure 6 such as the side frame of a railway truck. Inwardly from its end the shaft 4 flares outwardly in the provision of a shoulder 8.

The bearing assembly 2 includes a backing ring 10 which abuts against the shoulder 8. On its opposite side the backing ring 10 has a pair of concentric recesses 12 and 14, the latter being smaller than the former and set inwardly therefrom. The recess 14 receives the end of an enclosure ring 16 which for the most part is set slightly outwardly from the shaft 4. The opposite end of the ring 16, however, is reduced and snugly grips the shaft 4 so that the cylindrical outer surface 18 of the ring 16 is concentric about the axis of rotation for the shaft 4.

The portion of the cylindrical surface 18 located generally beyond the backing ring 10 is surrounded by a flinger 20 having a stepped configuration. More specifically, the flinger 20 includes an axially extending mounting wall 22 which embraces the reduced end of the enclosure ring 16. At its one end the wall 22 is provided with a lip 24 which projects radially inwardly along the end face of the enclosure ring 16. At its opposite end the mounting wall 22 merges into a radial wall 26 which extends outwardly from the enclosure ring 16, and the radial wall 26 in turn merges into a flinger wall or portion 28 which is concentric about the cylindrical surface 18, but is spaced outwardly therefrom. The flinger wall 28, moreover, extends generally axially with respect to the enclosure ring 16 and terminates approximately at the end of the backing ring 10.

Beyond the flinger 20 the shaft is fitted with a double row tapered roller bearing 30 including a pair of cones or inner races 32, a spacer 34 interposed between the cones 32, and a double cup 36 or outer race encircling the cones 32 and spacer 34. The cones 32 and cup 36 furthermore have opposed conical raceways on which tapered rollers 38 ride and the rollers 38 are maintained in properly spaced relation by a pair of cages 40. The end face of inboard cone 32 abuts against the lip 24 of the flinger 20, urging that lip snugly against the reduced end of the enclosure ring 16 to maintain the flinger 20 firmly in place with respect to the enclosure ring 20.

On the opposite side of the bearing 30, that is the outboard side, the shaft 4 carries another flinger 42 and enclosure ring 44, which are very similar to the flinger 20 and the enclosure ring 16. In particular, the enclosure ring 44 for the most part is presented away from the outer surface of the shaft 4 so that an annular lubricant passage 46 exists between the shaft 4 and ring 44. The inner end of the ring 44, however, is reduced and snugly engages the shaft 4 slightly beyond the outboard cone 32 so that the ring 44 is maintained concentric with respect to the axis of rotation. The enclosure ring 44, likewise, has a cylindrical outer surface 18 which is concentric to the shaft 4, and furthermore is provided with a plurality of apertures 48 which extend radially and communicate with the lubricant passage 46 immediately beyond the area of contact between the reduced end portion of the enclosure ring 44 and the shaft 4. The inboard enclosure ring 16 may or may not be provided with the apertures 48.

The outboard flinger 42 likewise includes a mounting wall 22, a lip 24 which is interposed between the outboard cone 32 and the reduced end portion of the ring 44 to maintain the flinger 42 in place. In addition the flinger 42 is provided with another radial wall 26, and finally a flinger wall or portion 28 which is presented outwardly from and concentric about the cylindrical outer surface 18 of the ring 44.

The backing ring 10, enclosure ring 16, flinger 20, bearing 30, flinger 42, and enclosure ring 44 are all held in place in that order by an end cap 50 which like the backing ring 10 has a pair of concentric recesses 52 and 54, the former of which opens inwardly and terminates at the outer end of the flinger 42, while the latter snugly receives the outer end of the outboard enclosure ring 16. The end cap 50 includes still another recess 56 set inwardly from the recess 54, and that recess receives the end of the shaft 4, but the wall surfaces defining it do not engage the shaft 4 so that a circular lubricant cavity 58 exists between the circular end face of the shaft 4 and the inwardly presented face of the end cap 50. The lubricant cavity 58 furthermore opens into the annular lubricant passage 46 across the circular end edge of the shaft 4. The end cap 50 is secured in place by capscrews 60 which pass through it and through the lubricant cavity 58, threading axially into the shaft 4 beyond the cavity 58. Thus, when the screws 60 are tightened the end cap 50 is advanced toward the shoulder 8, and the enclosure rings 16 and 44, the cones 32, the spacer 34, the lips 24 of the flingers 20 and 42, and the backing ring 10 are all compressed between the cap 50 and the shoulder 8. The end cap 50 is also provided with a threaded bore 62 which opens into the lubricant cavity 58 for supplying lubricants to that cavity. The bore 62 is normally closed by a removable pipe plug 64. Alternatively, it may also be closed by a conventional lubricant fitting.

The double cup 36 at each of its ends carries labyrinth enclosures 66 and 68 which project axially and encircle the enclosure rings 16 and 44, respectively. The enclosures 66 and 68 in turn each include a flexible labyrinth element 70 and a case 72, and the latter are pressed into and retained in recesses 73 formed in the ends of the cup 36.

Each enclosure case 72 possesses a stepped configuration and includes an axially extending outer wall 74 which is press fitted into and securely retained in one of the recesses 73. The outer wall 74 at the end of the cup 36 merges into an intermediate radial wall 76 which extends inwardly beyond the end of the adjacent cage 40 and the end faces of the rollers 38. The radial wall 76 in turn merges into an axially extending closure wall 78 which is spaced outwardly from the flinger wall 28 on the adjacent flinger 20 or 42, depending on the end of the cup 36, so that an annular space exists between the two walls 28 and 73. The closure wall 78 moreover extends axially outwardly beyond the end of the flinger wall 28 and into the recess 12 or 52, where it turns inwardly and merges to a radial end wall 80.

The labyrinth element 70 for each enclosure 66 and 68 is molded as an integral unit from a suitable elastomeric substance and is bonded to the end wall 80 of the corresponding case 72. More specifically, the labyrinth element 70 consists of a pair of mounting webs 84 and 86 which are bonded respectively to the inwardly presented face and the circular inner edge of the radial end wall 80 on the case 72 (FIG. 2). At the juncture of the webs 84 and 86 they are integrally attached to a flexible closure sleeve 88, which for the most part extends inwardly and is interposed between, yet is spaced from, both the flinger wall 28 of the flinger 20 or 42 and the cylindrical surface 18 of the enclosure ring 16 or 44. The radial distance between the sleeve 88 and the cylindrical surface 18 is considerably less than the distance between the sleeve 88 and the flinger wall 28, and moreover the inner face of the sleeve 88, that is the face which is presented toward the cylindrical surface 18, is provided with a plurality of axially spaced grooves 90. These grooves 90 create the labyrinths in the elastomeric enclosures 66 or 68 and those labyrinths generate turbulence in the lubricant circumscribed by them so as to form lubricant barriers along the shaft 4 when the shaft 4 rotates in the bearing 30. The far end of the case 72 for the outboard enclosure 68 projects into the recess 52 of the end cap 50 so that the end cap 50 shrouds the labyrinth element 70 of the enclosure 68 from dust and water. Similarly, the far end of the case 72 for the inboard enclosure 66 projects into the recess 14 of the backing ring 10.

The elastomer from which the flexible labyrinth elements 70 are molded should have a Shore A dorometer hardness between 60 and 80 when used with NGLI grade 1 or 2 lubricant. The foregoing parameters are ideally suited for bearing assemblies 2 which are used in railroad service.

OPERATION

The axle or shaft 4, the cones 32, the flingers 20 and 42, and the enclosure rings 16 and 44 rotate as a unit relative to the cup 36 and the labyrinth enclosures 66 and 68. As this relative rotation occurs, the flexible labyrinth enclosure elements 70 of the enclosures 66 and 68 function in the same manner conventional labyrinth enclosures, that is they form a lubricant barrier at the ends of the bearing 30 by generating turbulence in the lubricating medium. Thus, grease is maintained within the confines of the bearing 30, notwithstanding the fact that the elements 70 never actually engage the cylindrical surfaces 18 of the enclosure rings 16 and 44. The flingers 20 and 42, as their name implies, throw grease from accumulating in the vicinity of the labyrinth enclosure elements 70.

The bearing 30 may be initially lubricated and is relubricated at periodic intervals by injecting a pressurized lubricant, which is preferably a grease, through the threaded bore 62 in the end cap 50. The pressurized lubricant after passing through the bore 62 enters the lubricant cavity 58 wherein it spreads generally radially and flows into the annular lubricant passage 46 located between the outboard enclosure ring 44 and the shaft 4. The lubricant eventually flows through radial apertures 48 in the ring 44 and enters the annular space between the flinger wall 28 of the flinger 42 and the cylindrical surface 18 of the ring 44. Thus, the lubricant cavity 58 and the passage 46 as well as the lubricant to the interior of the case 72 forming part of the outboard closure 68. The flinger wall 28 located within that case 72 diverts the flowing lubricant toward the flexible closure sleeve 88 and the radial end wall 80, on the outboard labyrinth element 70 and the case 72, respectively. Since the annular space between the flinger wall 28 and the enclosure sleeve 88 is considerably larger than the annular space between the sleeve 88 and the cylindrical surface 18 on the ring 44, the lubricant will flow outwardly at the inner end of the outboard closure sleeve 88, or in other words it will be diverted across the outer surface of that portion of the sleeve 88 which projects into the flinger wall 28. The lubricant is then diverted by the radial end wall 80 into the next annular cavity located between the flinger wall 28 and the axial closure wall 78 of the outboard flinger 42 and the case 72, respectively. Inasmuch as the relatively viscous lubricant must be maintained under considerable pressure in order to create a flow through the relatively narrow space between the outer end of the flinger wall 28 and the inner face of the radial end wall 80 on the case 72, the pressure of the lubricant will force the flexible sleeve 88 of the outboard labyrinth enclosure 68 against the cylindrical surface 18 of the enclosure ring 44. Thus, a fluidtight seal is created between the flexible labyrinth element 70 and the enclosure ring 44, which during the operation of the bearing assembly 2 are normally maintained in spaced relation.

As lubricant continues to advance under pressure through the bearing 30, the air displaced by it, passes out of the bearing assembly 2 through the space between the other or inboard labyrinth element 70 and the enclosure ring 16 it surrounds. In time the lubricant will completely fill the voids in the bearing 30 and will flow into inboard enclosure 66, and particularly into the annular space between axial wall 74 of the inboard enclosure case 72 and the flinger wall 28 of the inboard flinger 20. The lubricant within this space is diverted at the radial end wall 80 of the inboard case 72 into the annular space between the flinger wall 28 and the flexible sleeve 88 of the inboard labyrinth element 70. The pressurized lubricant thereupon forces the flexible closure sleeve 88 against the cylindrical surface 18 of the enclosure ring 16 so that the lubricant will not flow out of the bearing assembly 2 when it fills. During the final moments of filling, entrapped air is vented through minor imperfections in the inwardly presented surface of the flexible closure sleeve 88 on the labyrinth enclosure 66. Since the flexible labyrinth element 70 in the inboard enclosure 66 prevents further application of grease once the bearing assembly has been filled with grease, no lubricant is wasted.

After the lubrication operation the internal pressure of the lubricant within the bearing assembly is relieved through minor imperfections in the inwardly presented surfaces of the flexible closure sleeves 88 on both of the enclosures 66 and 68, allowing those sleeves 88 to again separate from the cylindrical surfaces 18 of the enclosure rings 16 and 44. Thus, after the application of the lubricant the flexible labyrinth elements 70 resume their normal posture and function as conventional labyrinth lubricant barriers.

When the labyrinth elements 70 are molded from an elastomer having a relatively high flexibility and the lubricant is quite viscous, the flingers 20 and 42 may be eliminated and still the closure sleeves 88 will seal against the cylindrical surfaces 18 of the enclosure rings 44 and 16 as the bearing assembly 2 is relubricated. More specifically, the elastomer should have of Shore A dorometer hardness of between 50 and 75 and NLGI grade of the lubricant should be 2 or greater, if no flingers 20 and 42 are employed.

This invention is intended to cover all changes and modifications of the example of the invention herein chosen for purposes of the disclosure which do not constitute departures from the spirit and scope of the invention.

What is claimed is:

1. A bearing assembly comprising an outer bearing race, a shaft mounted inner bearing race in the outer race, rolling elements between the races, and enclosures at opposite ends of the bearing to cooperate with a circumferential surface on the shaft adjacent the ends of said inner bearing race, said closures being effective to retain a lubricant in the bearing assembly, and each enclosure comprising a rigid closure case positioned at the end of the outer race and an elastomeric closure member connected securely to the case, the closure member including a flexible sleeve encircling the circumferential surface and extending into the closure case, the sleeve being normally spaced outwardly from the circumferential surface whereby heat inducing friction is avoided and the elastomeric closure member does not overheat, and said flexible sleeve having a plurality of circumferential grooves spaced axially from one another and facing the circumferential surface so that turbulence will be generated in a lubricant encircled by the sleeve to retard movement of the lubricant axially along the circumferential surface, the enclosure cases and elastomeric closure members defining chambers for receiving lubricant under pressure with said flexible sleeves pressing against the circumferential surfaces on the shaft to prevent escape of the lubricant as the pressurized lubricant is introduced into the chambers.

2. A bearing assembly according to claim 1 wherein at least one of the circumferential surfaces forms the outwardly presented surface of an enclosure ring which encircles the shaft and has a portion spaced outwardly from the shaft; and wherein the space between the shaft and the enclosure ring forms part of a lubricant channel which communicates with the chambers.

3. A bearing assembly according to claim 2 and further characterized by a flinger supported for rotation with the shaft adjacent to the bearing and extending therefrom into the space between the sleevelike portion and the case, the flinger being spaced outwardly from the sleevelike portion and the case being spaced outwardly from the flinger; and wherein the lubricant channel communicates with the space enclosed by the case between the attached end of the flinger and the free end of the sleeve like portion of the labyrinth element.

4. A bearing assembly according to claim 3 wherein the flinger includes an inwardly turned lip which is interposed between the inner race and the enclosure ring, whereby the flinger is prevented from shifting axially in the bearing assembly.

5. A structure according to claim 2 and further characterized by a flinger having an axially extending portion which projects between the sleevelike portion and the case, and a radially extending lip which is captured between the inner race and the ring for securing the flinger to the shaft.

* * * * *